No. 877,293. PATENTED JAN. 21, 1908.
L. CATEL.
GEARING.
APPLICATION FILED MAR. 29, 1907.
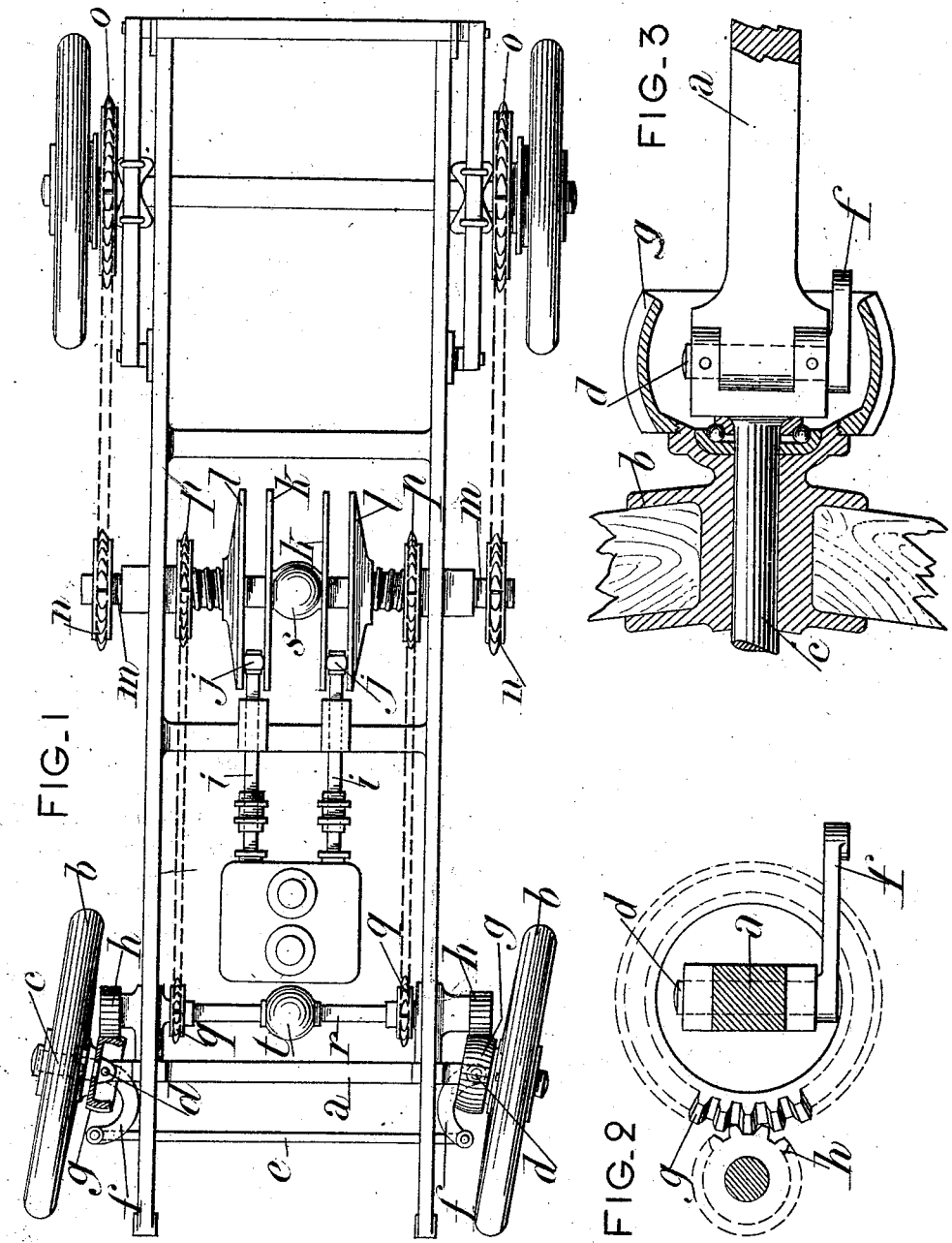
WITNESSES
INVENTOR
Lucien Catel

UNITED STATES PATENT OFFICE

LUCIEN CATEL, OF LYON, FRANCE.

GEARING.

No. 877,293.

Specification of Letters Patent.

Patented Jan. 21, 1908.

Application filed March 29, 1907. Serial No. 365,275.

*To all whom it may concern:*

Be it known that I, LUCIEN CATEL, a citizen of the French Republic, residing at Lyon, France, have invented a certain new and useful Gearing, of which the following is a specification.

This invention relates to driving or transmission gearing which enables driven members to be rotated through angles relatively to fixed shafts. This result is obtained by using a spherical gearing, and allows, for example, of transmitting power to the steering wheels of a vehicle. The gearing can also be used in connection with other mechanism, for example for driving the propellers of ships or flying-machines, to enable the said propellers to be used for steering.

A construction embodying the invention as applied to driving the front-wheels of a motor-car is illustrated in the annexed drawing, in which Figure 1 is a plan-view of the mechanism, Fig. 2 a vertical cross-section of the front-axle on a larger scale, and Fig. 3 a vertical section in a plane parallel with the said axle.

The axle of the steering wheels $b$ comprises a stationary part $a$ and two movable parts $c$, the latter being pivotally connected to the former by means of a fixed vertical pivot $d$, which engages the part $a'$. The two pivots $d$ have arms $f$ which are connected to each other by a rod $e$, so that neither wheel $b$ can be deflected without moving the other wheel in correspondence therewith.

To each wheel $b$ is fixed a spherical gear-wheel $g$ co-axial therewith and meshing with a pinion $h$.

The axes of rotation of the two gear wheels $g$ and $h$ must be in the same horizontal plane. The shape of the gear-wheels $g$ enables them to be rotated about vertical axes without disengaging them from the pinions $h$.

To the motor-shafts $i$ are fixed rollers $j$ adapted to rotate friction disks $k$ and $l$. The disks $k$ are fixed to a horizontal shaft $m$ to which are fixed sprocket-wheels $n$ connected by chains to sprocket-wheels $o$ fixed to the axle of the rear-wheels. The disks $l$ are loosely mounted on the shaft $m$ and rotate in the opposite direction to the disks $k$. To the disks $l$ are fixed sprocket-wheels $p$ connected by chains to sprocket-wheels $q$ fixed to the shaft $r$, to which are also fixed the pinions $h$, so that the leading road-wheels $b$ are driven in the same direction as the rear-wheels. The relative sizes of the sprocket-wheels, pinions and spherical gear wheels are so chosen that the front and rear-wheels are driven at the same speed.

The shafts $m$ and $r$ may be provided with balance gearing $s$ and $t$.

Details of construction can of course be modified in various ways. For example, the pinions $h$ may be placed in front of the spherical gear-wheels, or each of the latter may be driven by means of two pinions, one placed in front and the other behind, but the axes of the pinions and spherical wheels must be in the same horizontal plane.

What I claim as my invention and desire to secure by Letters Patent of the United States is:—

The combination of a stationary shaft, an oscillatory shaft connected to each end thereof and forming a continuation of the shaft, an arm connected to each oscillatory shaft, a rod connecting the arms together, a globular toothed wheel on each oscillatory shaft, and a pinion on a fixed axis meshing with each wheel.

In witness whereof I have signed this specification in the presence of two witnesses.

LUCIEN CATEL.

Witnesses:
 GASTON JEAUNIAUX,
 THOS. N. BROWNE.